US012737700B2

(12) United States Patent
King et al.

(10) Patent No.: US 12,737,700 B2
(45) Date of Patent: Sep. 15, 2026

(54) MATERIALS AND PROCESS INTEGRATION FOR BUILD PROJECTS WITH MOAB ASSEMBLIES

(71) Applicant: eVolve MEP, LLC., Atlanta, GA (US)

(72) Inventors: Steve King, Atlanta, GA (US); Adam Heon, Atlanta, GA (US); Alex Norris, Atlanta, GA (US); Clay Freeman, Atlanta, GA (US)

(73) Assignee: Evolve MEP, LLC, Atlanta, GA (US)

( * ) Notice: Subject to any disclaimer, the term of this patent is extended or adjusted under 35 U.S.C. 154(b) by 68 days.

(21) Appl. No.: 18/232,129

(22) Filed: Aug. 9, 2023

(65) Prior Publication Data

US 2025/0053900 A1 Feb. 13, 2025

(51) Int. Cl.
*G06Q 10/06* (2023.01)
*G06Q 10/0631* (2023.01)

(52) U.S. Cl.
CPC . *G06Q 10/06313* (2013.01); *G06Q 10/06316* (2013.01)

(58) Field of Classification Search
CPC ...................................................... G06Q 10/06
See application file for complete search history.

(56) References Cited

U.S. PATENT DOCUMENTS 11,720,838 B2 8/2023 Jafari et al.
2002/0016729 A1* 2/2002 Breitenbach ........... G06Q 10/06 707/999.1
2007/0192715 A1* 8/2007 Kataria ................ G06Q 10/087 705/28
2009/0171735 A1 7/2009 Cushing et al.
2013/0024226 A1* 1/2013 Bourke .................. G06Q 10/06 705/7.12

(Continued)

FOREIGN PATENT DOCUMENTS

CA 2782023 A1 * 6/2011 ............. G06Q 10/06
CA 3055346 C 9/2018
WO WO-2024226722 A2 * 10/2024

OTHER PUBLICATIONS

R. Akkerman and D.P. van Donk, Analysing scheduling in the food-processing industry: Structure and tasks, Cognition, Technology and Work, 11(3), 215-226, 2009. (Year: 2009).*

(Continued)

*Primary Examiner* — Kurtis Gills
(74) *Attorney, Agent, or Firm* — Clayton, McKay & Bailey, PC

(57) ABSTRACT

Systems and methods are described for creating moab assemblies and applying moab assemblies to build project data. Moab assemblies can logically link materials and tasks for components used in a build project. When a model of a build project is created, an application service can retrieve the moab assemblies of components included in the build project. Using the moab assemblies, the application service can determine what materials are needed at what location and when, and also determine what tasks must be performed and when. The application service can display the tasks for the build project, and the materials needed for the tasks, in a user-friendly format. In one example, the application service can display tasks and materials by work phase of the build project.

20 Claims, 8 Drawing Sheets

(56) References Cited

U.S. PATENT DOCUMENTS

| | | | | |
|---|---|---|---|---|
| 2015/0153724 | A1* | 6/2015 | Platt | G06Q 30/0621<br>700/98 |
| 2015/0186825 | A1* | 7/2015 | Balasubramhanya | G06Q 10/067<br>705/7.25 |
| 2022/0197306 | A1* | 6/2022 | Cella | G05B 19/41865 |

OTHER PUBLICATIONS

Varadi, Zoltan, “Mapping work content allocation on an assembly cell,” 2022, FIKUSZ Symposium for Young Researcher, pp. 507-517 (Year: 2022).

* cited by examiner

MATERIALS AND PROCESS INTEGRATION FOR BUILD PROJECTS WITH MOAB ASSEMBLIES

BACKGROUND

Modeling software, like computer-aided design ("CAD") and building information modeling ("BIM"), are commonly used for designing projects. BIM software in particular is used for designing and constructing complex building structures. Using such modeling software, users can add components, such as outlets, wiring, air ducts, etc., and designate where each component belongs. Constructing a build project often requires numerous tasks. These tasks are typically broken down into work phases based on a logical progression of the construction process. For example, electrical wiring, heating, ventilation, and air conditioning ("HVAC") systems, and plumbing should be installed before interior walls. So electrical, HVAC, and plumbing can be assigned to their own work phases that are scheduled to occur before a work phase for installing the interior walls.

Components needed for a work phase must be fabricated and delivered before scheduled installation at a job site. The processes and materials required for fabrication varies for each component. Currently, employees must learn what components must be procured versus fabricated, what processes and materials are needed for fabricating components, what machines a business has available for fabrication, fabrication times, and so on. This creates multiple problems. First, this knowledge is lost when an employee leaves, and the replacement employee must then be tasked with learning the details of component fabrication for the business. Second, different employees may use different methods for fabricating a component for a build project, which can create confusion and inconsistencies. For example, if a particular type of component has a problem, it can be difficult to identify the cause if the components were not all fabricated the same way.

As a result, a need exists for streamlining component fabrication of a build project.

SUMMARY

Examples described herein include systems and methods for creating moab assemblies and generating project tasks based on a moab assembly. A moab assembly can be one or more data files that logically links materials and tasks for a component of a build project. For example, a moab assembly can include a logical progression of tasks for procuring materials for fabricating a component, tasks for fabricating the component, and tasks for installing the component into the build project. Moab assemblies can also identify materials needed for each task, production states, and subcomponents.

When a user creates a model of a build project, such as a CAD or BIM model, the model can identify components and materials needed for the build project. The build project data from the model can be sent to a moab assembly application service. The application service can identify components for the model and retrieve their corresponding moab assemblies. The application service can also have access to data about an organization's fabrication resources. Such data can identify which components can be fabricated, what additional materials must be procured to fabricate those components, which components must be acquired from a third party, and so on. In one example, this data can be included in the moab assemblies.

Users can identify work phases of the build project. This can be done in a modeling application or in a graphical user interface ("GUI") provided by the application service. A work phase can correspond to a segment of the build process of the project that is dedicated to a particular type of task. For example, a build project can have a work phase for installing framing, another work phase for installing electricity, another work phase for installing ductwork, and so on. The work phases can have a designated order in which they must be performed. For example, electricity, plumbing, and ductwork must be installed before interior walls.

The application service can use the moab assemblies with the build project data and work phase data to determine the tasks and materials for each work phase. A user, such as a project manager, can use a GUI provided by the application service to view the tasks and materials by work phase. If a delay occurs at one stage in the fabrication of a component, the GUI can allow the project manager to see how the delay will affect future tasks for that work phase.

The application service can automate some tasks in a moab assembly. For example, the moab assembly can designate a vendor for a particular material, and the application service can be configured to place an order for materials identified in the moab assembly. The application service can also create jobs at a work cell based on a shop task in a moab assembly. Using only the model of a build project and the moab assemblies, the application service can order materials to be delivered at a site where they will be used to fabricate components, and the application service can create the jobs that causes them to be fabricated. The application service can do this without any manual actions required by a user.

The application service can provide GUI for creating moab assemblies. A user can create tasks of various types, such as procurement, shop, and field tasks, add materials needed for each task, and organize the materials and tasks based on their logical progression. The user can also identify vendors for materials, identify work cells for tasks, designate tasks for automated or manual execution, and so on. The moab assemblies thereby integrate the materials and processes needed for a build project.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Systems and methods are described for creating moab assemblies and applying moab assemblies to build project data. Moab assemblies can logically link materials and tasks for components used in a build project. When a model of a build project is created, an application service can retrieve the moab assemblies of components included in the build project. Using the moab assemblies, the application service can determine what materials are needed at what location and when, and also determine what tasks must be performed and when. The application service can display the tasks for the build project, and the materials needed for the tasks, in a user-friendly format. In one example, the application service can display tasks and materials by work phase of the build project.

Figure 1:
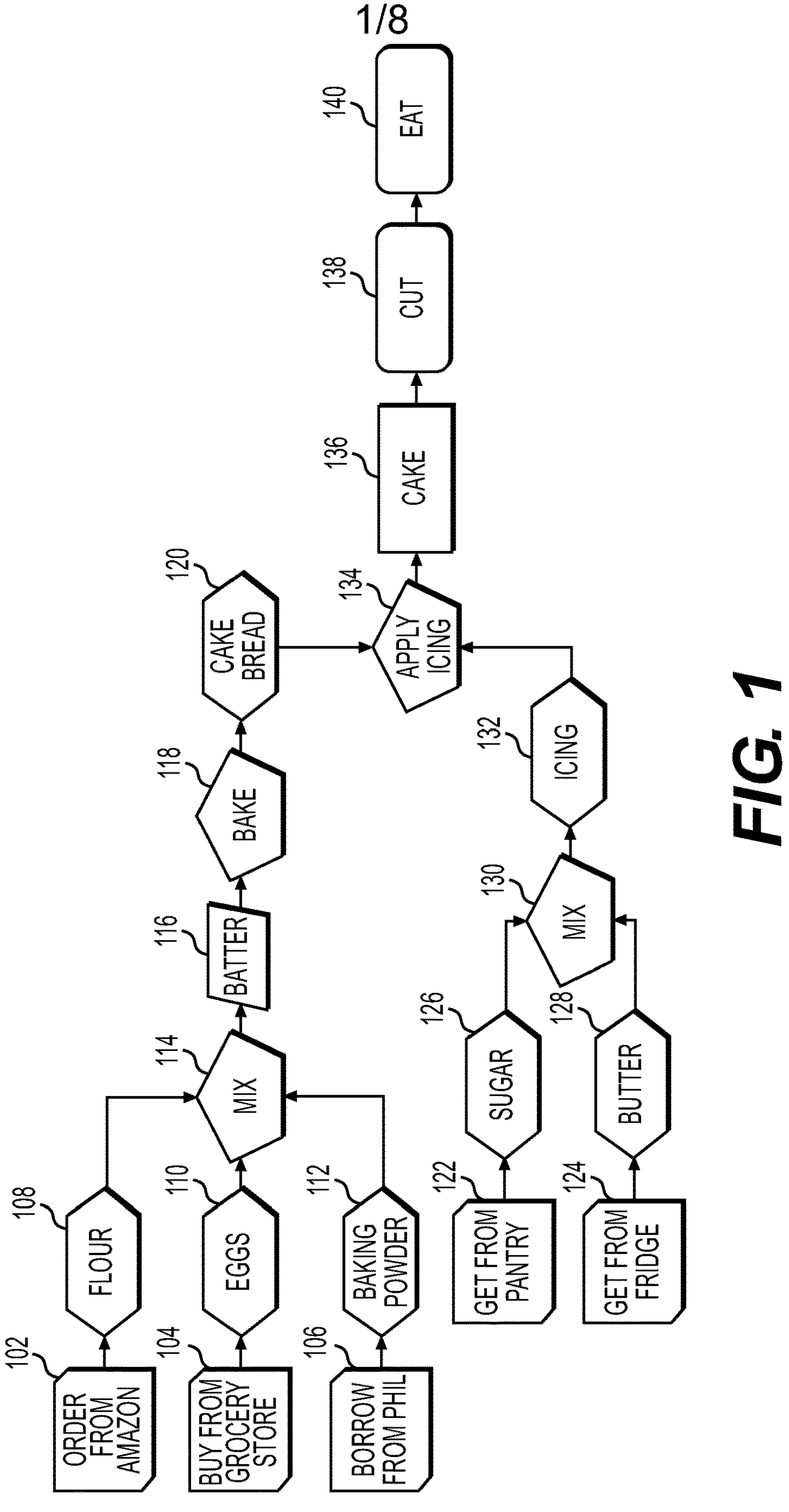
FIG. 1 is a flowchart of an example moab assembly.
Figure 2:
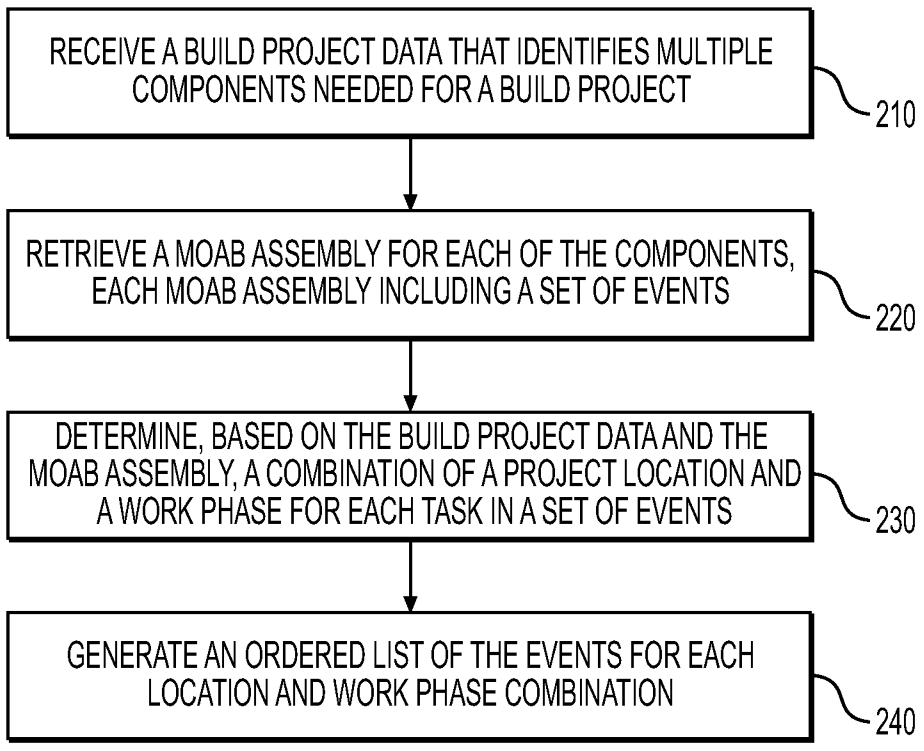
FIG. 2 is a flowchart of an example method for generating project tasks based on a moab assembly.
Figure 3:
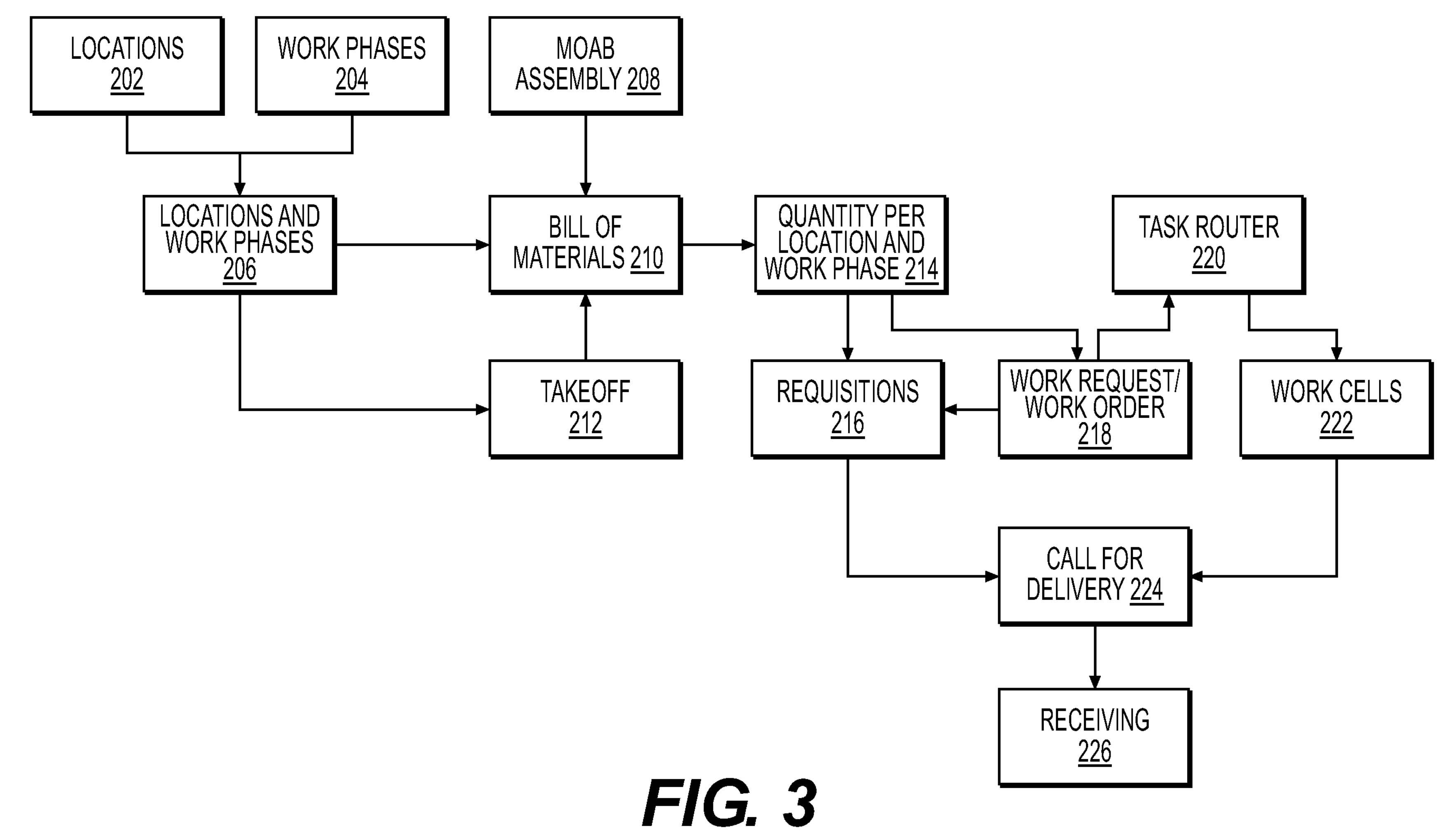
FIG. 3 is another flowchart of an example method for generating project tasks based on a moab assembly.
Figure 4:
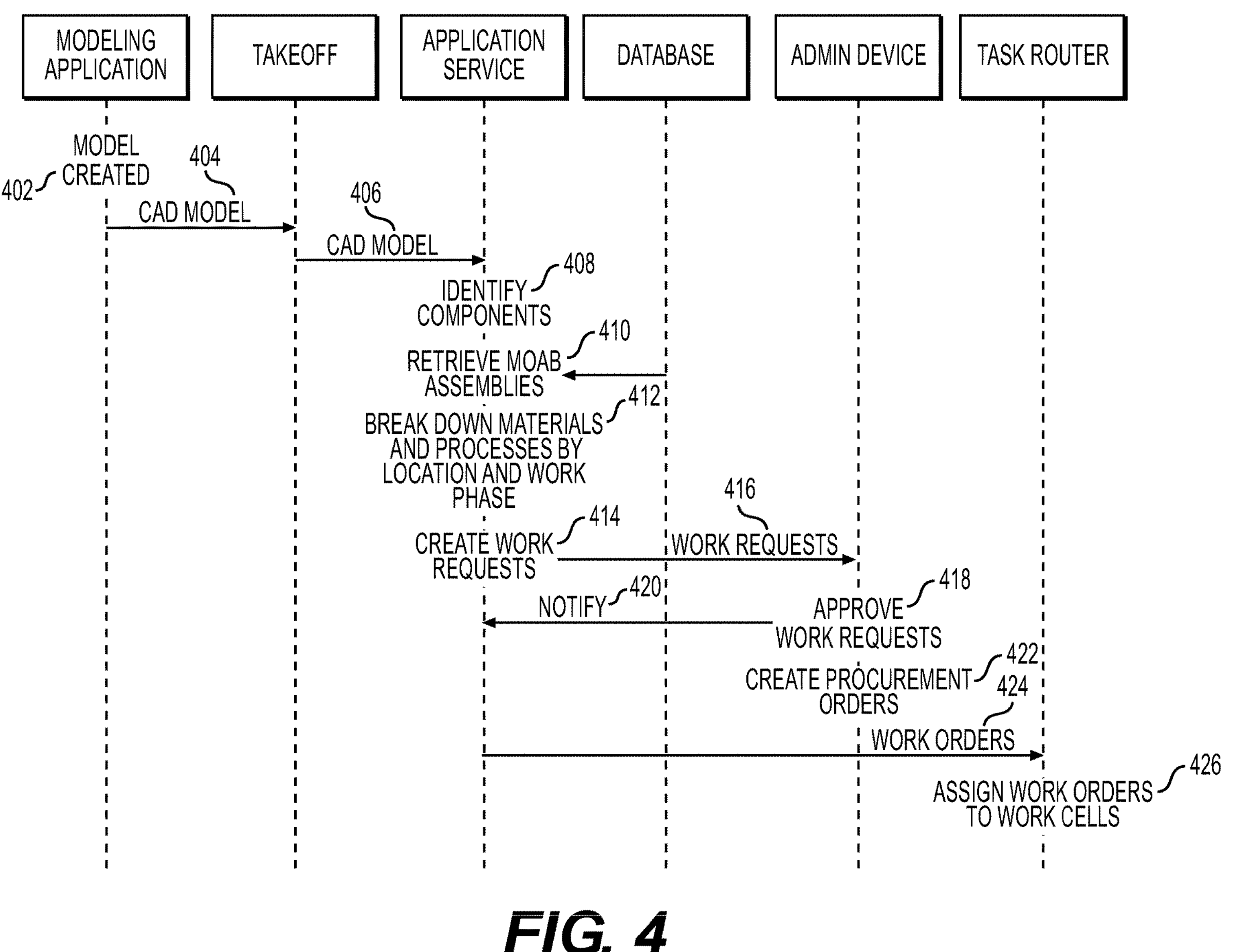
FIG. 4 is a sequence diagram of an example method for generating project tasks based on a moab assembly.
Figure 5:
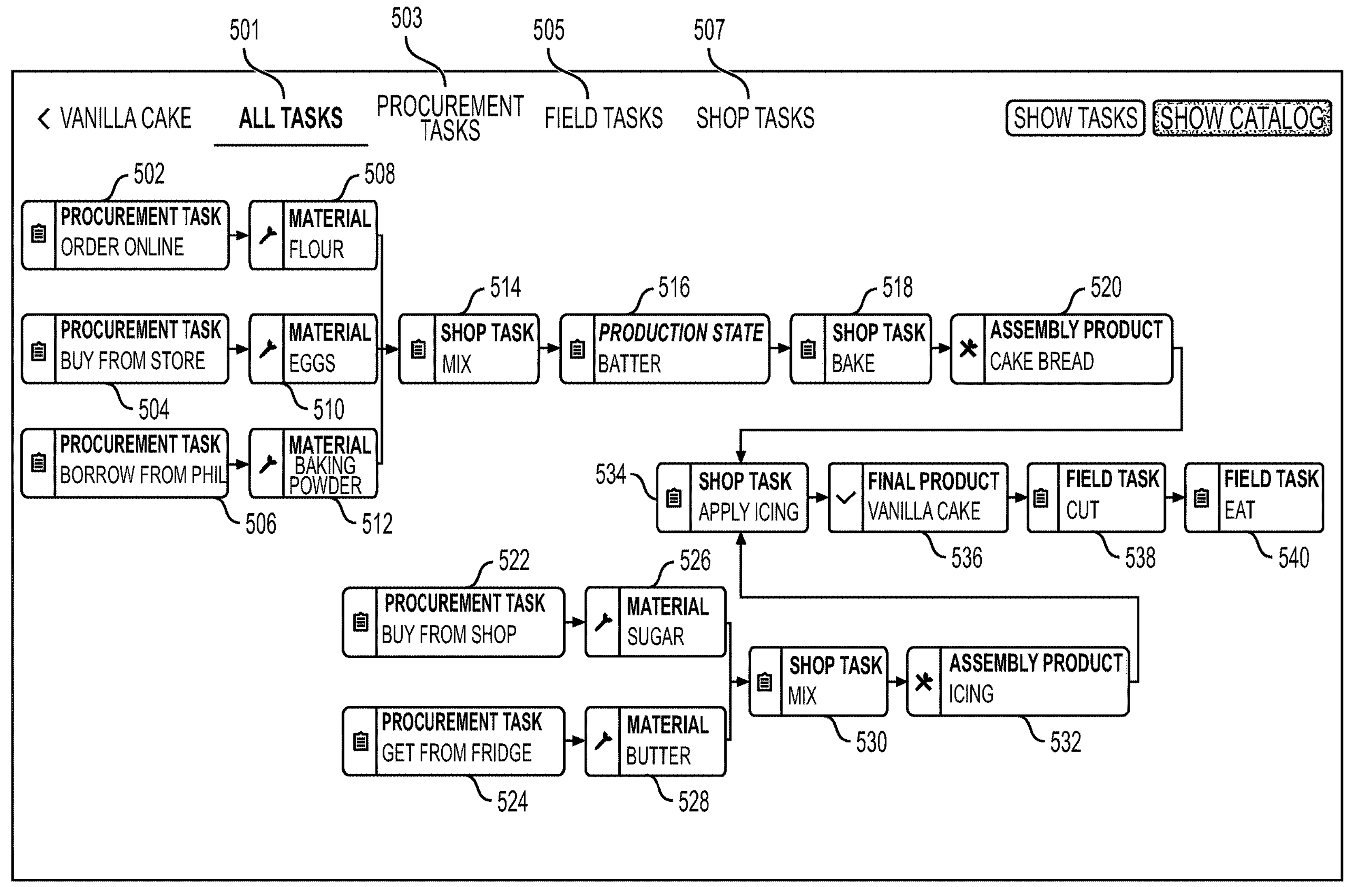
FIG. 5 is an illustration of an example graphical user interface ("GUI") for generating a moab assembly.
Figure 6A:
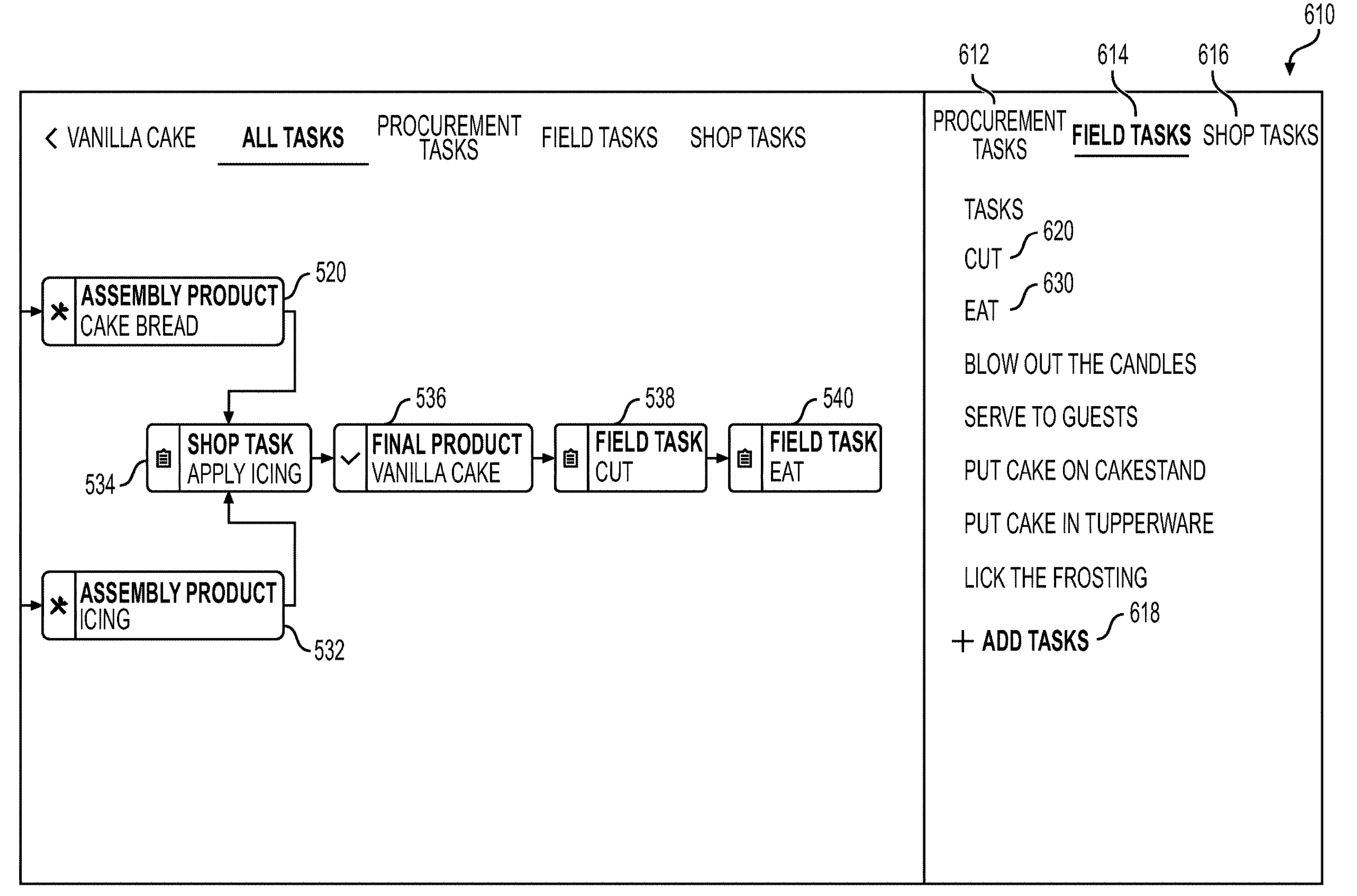
FIG. 6A is an illustration of another example GUI for generating a moab assembly.
Figure 6B:
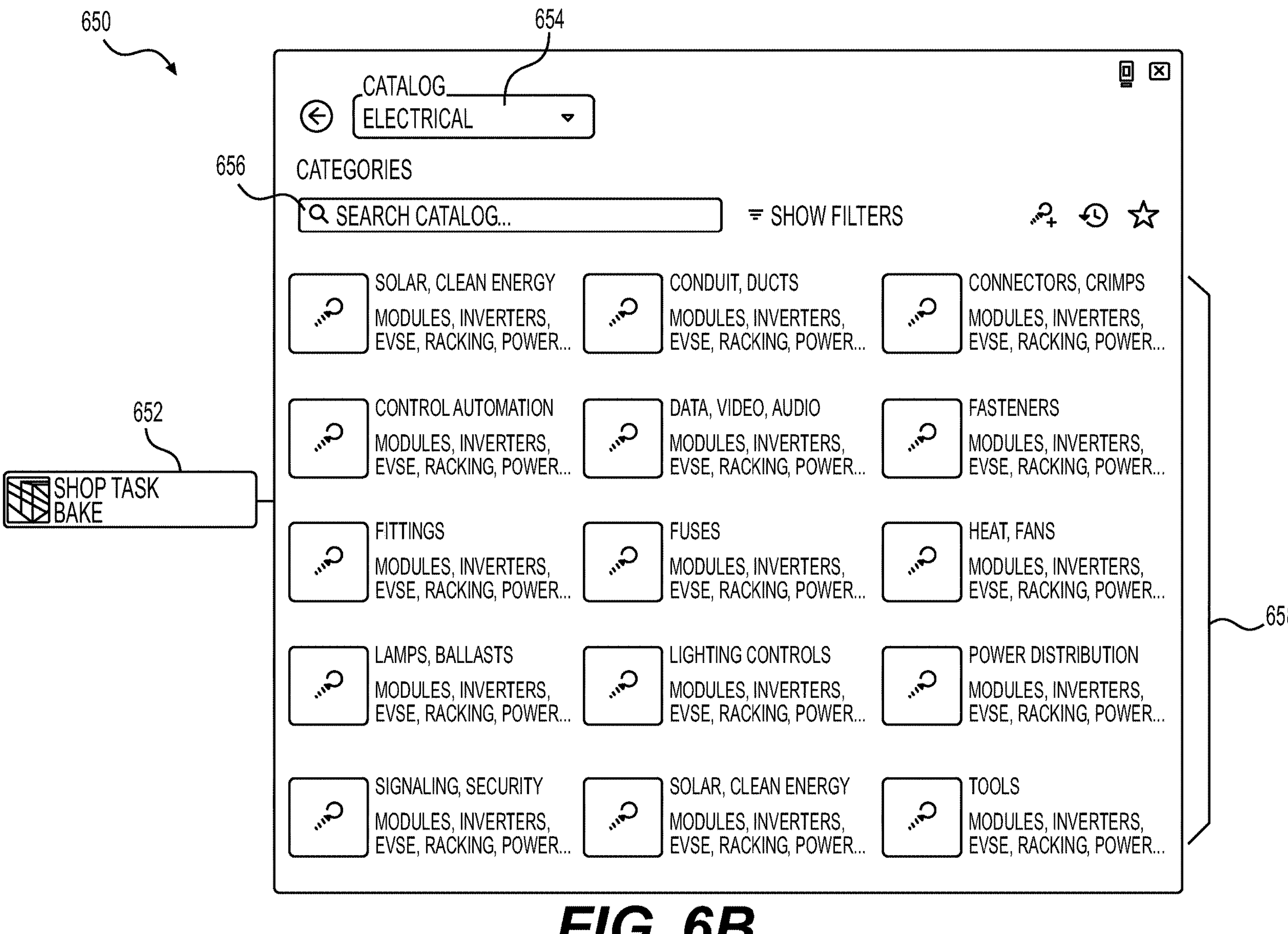
FIG. 6B is an illustration of an example component addition window in a GUI for generating a moab assembly.
Figure 7:
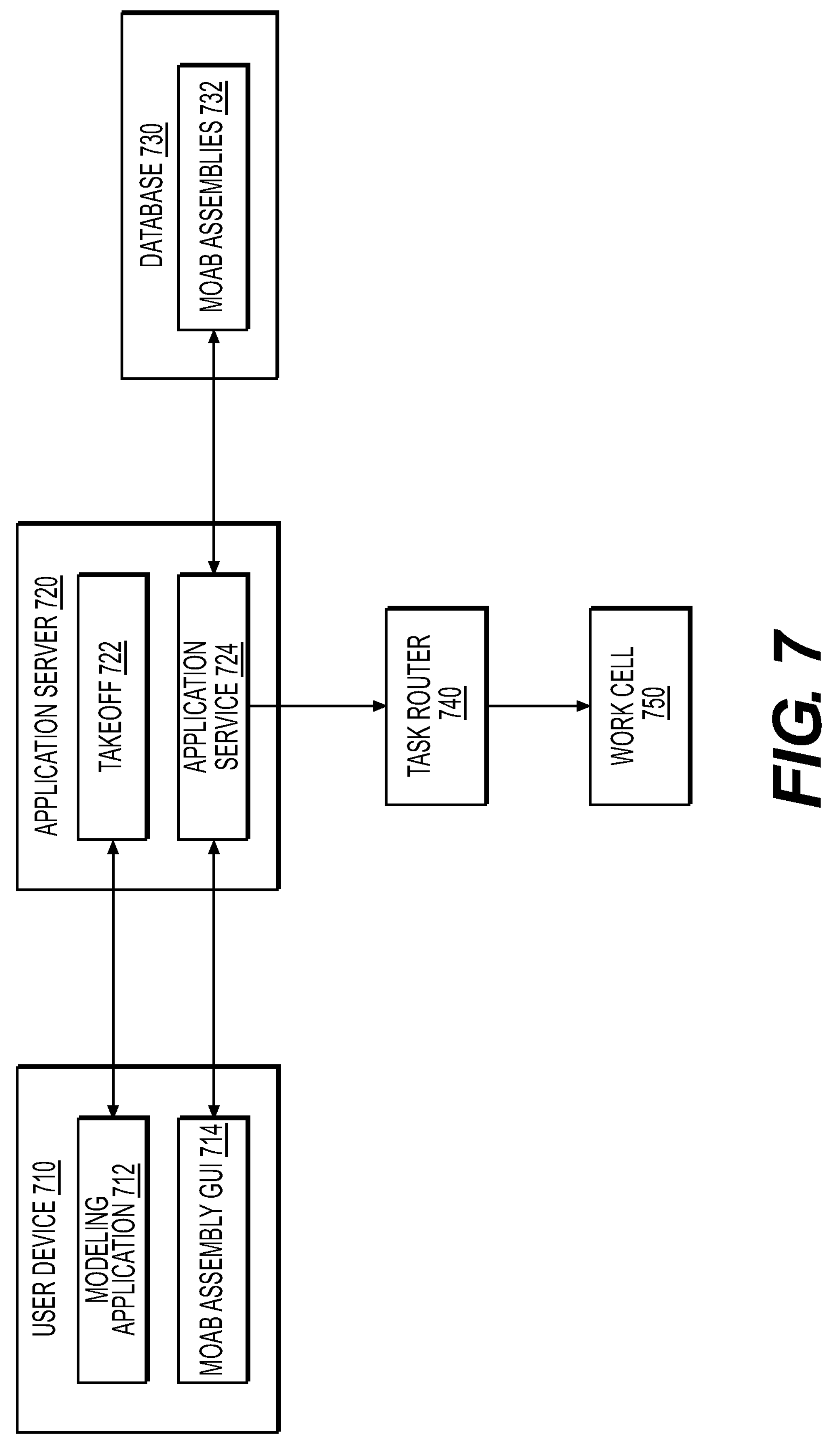
FIG. 7 is an illustration of an example system for generating project tasks based on a moab assembly.

FIG. 1 is a flowchart of an example moab assembly. FIG. 2 is a flowchart of an example method for generating project tasks based on a moab assembly. FIG. 3 another flowchart of an example method for generating project tasks based on a moab assembly. FIG. 4 is a sequence diagram of an example method for generating project tasks based on a moab assembly. FIG. 5 is an illustration of an example graphical user interface ("GUI") for generating a moab assembly. FIG. 6A is an illustration of the GUI from FIG. 5 and includes a task window for adding tasks to a moab assembly. FIG. 6B is an illustration of an example component addition window from the GUI from FIG. 5 that allow a user to add components from a catalog to a task in a moab assembly. FIG. 7 is an illustration of an example system for generating project tasks based on a moab assembly.

A moab assembly can logically link materials and tasks for a project. For example, a moab assembly can include a logical progression of the tasks needed to complete a project, and the tasks can be linked to a hierarchy of materials needed to complete the task. For example, one level of a materials hierarchy can represent materials that must be procured for a task, and another hierarchy level can represent materials created by a task. A moab assembly can include various types of tasks. For example, a moab assembly can include procurement tasks, shop tasks, and field tasks. Procurement tasks can correspond to procuring a component or a material for creating a component. Shop tasks can correspond to a process U for creating a component or subcomponent using procured materials. Field tasks can correspond to installing the corresponding component into the project. The term "component" can refer to any product or part used in a build project.

FIG. 1 is a flowchart that illustrates an example moab assembly 100. The moab assembly 100 relates to project for making a cake. The moab assembly 100 includes the three types of tasks described above. Procurement tasks are illustrated by rectangular boxes with the top right and bottom left corners cut, shop tasks are illustrated by pentagons, and field tasks are illustrated by rectangles with rounded edges. Additionally, materials or subcomponents to be procured or created during the process are illustrated by the hexagonal polygons, a material or subcomponent in a production state is illustrated by a rhombus, and the final component created in the shop is illustrated by the rectangle with sharp edges.

The moab assembly 100 shows five materials that must be procured: flour 108, eggs 110, baking powder 112, sugar 126, and butter 128. Procurement tasks 102, 104, 106, 122, and 124 that precede those materials indicate that those materials must be procured as opposed to created in the shop. The procurement tasks 102, 104, 106, 122, and 124 also indicate from where the corresponding material can be procured. For example, the procurement task 102 indicates that the flour 108 should be purchased from AMAZON, the procurement task 104 indicates that the eggs 110 should be purchased from a grocery store, the procurement task 106 indicates that the baking powder 112 should be borrowed from Phil, the procurement task 108 indicates that the sugar 126 should be retrieved from the pantry, and the procurement task 124 indicates that the butter 128 should be retrieved from the fridge.

The flour 108, eggs 110, and baking powder 112 link to the mix shop task 114, indicating that those materials should be mixed. The mix shop task 114 links to batter 116, indicating that performing the mix shop task 114 will produce batter, which is a production state. A production state can refer to a non-purchasable part after being processed by a shop task or subassembly required to make the product. The batter production state 116 then links to another task, a bake shop task 118, indicating that the batter should be baked. The bake shop task then links to the cake bread material 120, indicating that baking the batter will produce cake bread.

Returning to the sugar 126 and butter 128, these materials link to the mix shop task 130, indicating that they should be mixed. The mix shop task 130 links the icing material 132, indicating that mixing the sugar 126 and butter 128 will produce icing. The cake bread 120 and icing 132 can be combined at the apply icing shop task 134. Performing the apply icing shop task 134 produces the final component, the cake 136. The cut field task 138 and eat field task 140 indicate tasks for implementing the cake 136. Implementing can indicate any type of action associated with the final component, such as using, installing, and assembling.

Although the field tasks 138 and 140 in the example moab assembly 100 indicate a finality of the cake's usage (i.e., making and eating the cake represents the entirety of the project), field tasks can indicate how the final component should be integrated into the project. For example, a field task for a moab assembly can link to another moab assembly. As an example, a moab assembly for a duct assembly can link to a moab assembly for an HVAC, indicating how the duct assembly should be incorporated into the HVAC system.

As shown in the moab assembly 100, the flour 108, eggs 110, and baking powder 112 are in a different branch than the sugar 126 and butter 128. This is because they are used in different shop tasks to perform different functions. For example, the flour 108, eggs 110, and baking powder 112 are used to make cake bread 120, and the sugar 126 and butter 128 are used to make icing. Different machinery may be required to perform the shop tasks associated with the materials. For example, a first mixer may be used to mix the flour 108, eggs 110, and baking powder 112, a second mixer may be used to mix the sugar 126 and butter 128, and an oven may be used to bake the batter 116. Separating the materials into branches allows a user to view what materials are needed for each task. This can aid in forecasting how a disruption in procurement may affect fabrication in a shop, and how that in turn may affect installation in the field.

Moab assemblies can be retained as data files, such as JavaScript Object Notation ("JSON") or Extensible Markup Language ("XML") files. In one example, moab assemblies can be stored as one or more data tables. For example, a moab assembly file can include a first data table with an entry for each node (i.e., each task, production state, subcomponent created, etc.) in the moab assembly that identifies the node type, such as a task type, a production state, or subcomponent created by task. The moab assembly file can include a second data table for edges that connect the nodes. The second data table can map each edge's starting point and ending point to its corresponding nodes. As an example, for the moab assembly 100, the second data table can include an entry for an edge that maps the starting point to the mix procurement task 114 and the ending point to the batter production state 116.

Many of the example methods described later herein refer to the moab assembly 100 for baking a cake. Those references are merely used as examples and are not intended to be limiting in any way. For example, a moab assembly can be for any physical component or part, such as a duct fitting, electrical wiring, window enclosure, and so on.

FIG. 2 is a flowchart of an example method for generating project tasks based on a moab assembly that illustrates the flow of data from design to delivery for a project. At stage 210, an application service can receive data for a build project. The build project data can include any data related to a build project. For example, the build project data can include primary spatial dimensions, estimated labor hours, estimated costs, a BOM, a BOP, and so on. The build project data can be created using any modeling software application for build projects, such as a CAD or BIM application like REVIT, SKETCHUP, and ARCHICAD. The build project data can be received as one or more data files, such as drawing ("DWG"), Drawing Exchange Format ("DXF"), Industry Foundation Classes ("IFC"), or REVIT ("RVT") files.

The build project data can be received directly from a modeling application or from another source. For example, the build project data can be received from a takeoff software application that c This can include determining the amount of material needed for a build project. The takeoff software can provide this account to the application service so that the application service has a complete list of all components of the project.

The build project data can include location and work phase data for the build project. For example, the process of completing a build project can occur a various locations, and each location can have different work phases. As an example, when constructing a building, one location may be where the finished building will be. That location may have various work phases, such as pouring concrete, assembling internal framework, installing plumbing, and installing electricity. Some processes can occur at a different location. For example, for an HVAC system, ductwork, return and supply registers, and refrigerant lines can be fabricated at a warehouse shop and then transported to the build site. Some modeling software, such as REVIT, allow users to designate locations and work phases when modeling a built project. This data can be included in the build project data. Alternatively, a user can input location and work phase information into a GUI associated with the application service of the moab assemblies.

At stage 220, the application service can retrieve a moab assembly for each component identified in the build project data. For example, when is creating a moab assembly, a user can map the moab assembly to its corresponding component. The mappings can be stored in any format, such as a data table. The application service can use the data table to identify the moab assembly corresponding to a component and retrieve the data file of that moab assembly.

At stage 230, the application service can determine, based on the build project data and the moab assembly, a combination of a project location and a work phase for each task in the moab assembly. In other words, for each work phase of the project, the application service can determine what materials are needed at the corresponding location, when the materials are needed, and what tasks must be performed. In one example, the application service can do this using information included in the build project data and the moab assembly. For example, the user can designate a work phases for the build project in the modeling application, which can include scheduled dates for when the work phase will occur. The work phase information can be included in the build project data. The build project data can also identify how much of each component is needed at each phase. As an example, for a work phase related to installing duct work, the build project can identify each component that will be needed for installing the duct work, the quantity of each component is needed, and a scheduled date for the installation. The moab assembly for each component identifies what materials are needed for producing a single component, how much of each material is needed, and what tasks must be completed to produce the component. The moab assembly, or another data file accessible by the application service, can include information about the time required for procuring the materials, producing sub-components, assembling the component, delivering the component, installing the component, and so on. Based on all the information above, the application service can determine the quantity of each material needed, where the materials are needed, when the materials are needed, what tasks must be performed, and when the tasks must be performed so that the final component can be delivered on time at the build site.

At stage 240, the application service can generate an ordered task list for each work phase. The tasks can include information about each task, such as raw materials needed, budgeted labor hours, required skills, scheduled dates, and so on. The ordered task list can be presented to a user. For example, the ordered task list can be displayed in a GUI associated with the application service. Any preliminary tasks that must be performed at another location or during another work phase can be included in the ordered task list. This can aid a user in predicting the effects of delays in acquiring certain raw materials or performing certain preliminary tasks. The GUI can also present the tasks in a flowchart format, such as the format of the moab assembly 100 illustrated in in FIG. 1. A GUI that can display the tasks by work phase is described later herein regarding FIGS. 6 and 7.

In some examples, the application service can initiate execution of certain tasks. For example, the application service can order raw materials for delivery at a location where the raw materials will be used and schedule jobs for the appropriate machinery. The application service can do this using information in the moab assemblies and from other sources. For example, users can provide information about available vendors and what raw materials each vendor can provide, machinery that an organization has, what tasks each machine can perform, what work cell each machine belongs to, and so on. This can be done using the GUI of the application service. When creating a moab assembly, a user can assign certain tasks to shops or machinery previously added, or input new information for vendors, shops, or machinery. Based on these assignments, the application service can automatically place orders and schedule jobs. As an example, shop tasks in a moab assembly can be mapped to a type of machine needed to complete the task. The application service can have access to another data table with information about each machine an organization has available for performing shop tasks, what type of task each machine can perform, and where each machine is located, such as which shop or work cell. The application service can route tasks to work cells based on availability and location. For example, the user can identify the location of the build site, and the application service can route shop tasks to available work cells that are closest to the build site.

Using the moab assembly 110 as an example, the process steps for manufacturing the cake bread 120 can occur at a first shop, and the process steps for manufacturing the icing 132 can occur at a second shop. Information regarding vendors for the raw materials can already be available based on previous input from users. The application service can place orders for the flour 108, eggs 110, and baking powder 112 with delivery at the first shop. The first shop can have equipment for making the batter 116 and baking the batter 116 into the cake bread 120, such as a mixer and an oven. The application service can place orders for the sugar 126 and butter 128 with delivery at the second shop. The second shop can have equipment for making the icing 132, such as a mixer. The application service can schedule a job for a mixer at the first shop for performing the mix shop task 114, schedule a job for an oven at the first shop for performing the bake shop task 118, and schedule a job for a mixer at the second shop for performing the mix shop task 130. The application service can also schedule for the cake bread 120 and icing 132 to be delivered to a third shop where the icing can be applied to the cake bread 120. The application service can also schedule a job at the appropriate machinery for performing the apply icing task 134. The application service can also schedule the resulting cake 136 to be delivered to a site where the field tasks of cutting 138 and eating 140 take place.

FIG. 3 is a flowchart that illustrates an example of dataflow when generating project tasks based on a moab assembly. In FIG. 3, even numbered elements represent data and odd numbered elements represent a flow of data. A user can designate locations 202 and work phases 204 for a build project. The user can do this using a modeling application or a GUI associated with the moab assemblies, for example. At stage 201, the locations 202 and work phases 204 can be combined into location and work phases 206. For example, each work phase 204 can be associated with a specific location 204. The user can assign work phases 204 to their corresponding locations 202, and these assignments can be included in the locations and work phases 206. The user can input the locations 202 and work phases 204, and also assign work phases 204 to their corresponding locations 202, using a modeling application. Alternatively, a GUI can be provided to the user for inputting this information, such as a GUI associated with the application service for the moab assemblies.

At stage 203, the locations and work phases 206 can be added to a BOM 210. The BOM 210 can include a list of raw materials, sub-assemblies, intermediate assemblies, subcomponents, parts, and the quantities of each needed to complete the build project. Alternatively, at stage 205, the locations and work phases 206 can be loaded into a takeoff 212. The takeoff 212 can include all the content associated with the build project modeled in the modeling application. This data can be received directly from the modeling application. The takeoff 212 can quantify the amount of each material needed to complete the build project. The BOM 210 can be generated using the takeoff 212, including the locations and work phases 206.

At stage 209, moab assemblies 208 can be retrieved for each item listed in the BOM 210. For example, content from the modeling application, such as build components, can be mapped to a corresponding moab assembly. The application service can retrieve the moab assemblies 208 corresponding to the components listed in the BOM 210.

At stage 211, the moab assemblies 208 can be applied to the BOM 210, including the locations and work phases 206, to determine a quantity per location and work phase 214. The quantity per location and work phase 214 can indicate how much of each item in the BOM 210 is needed for each work phase at each location.

The moab assemblies 208 can indicate that some components in the BOM 210 should be ordered and do not require any manufacturing. For such components, the application service can create requisitions 216 at stage 213. When requisitioned components are ready, they can await a call for delivery 224 at their corresponding locations. When a call for delivery 224 is made at stage 215, the corresponding components can be delivered to the site for receiving 226.

The moab assemblies 208 can indicate that some components in the BOM 210 require manufacturing. The work requests can be sent to an admin at stage 217. The admin can review the work requests to create work orders 218. Each work request can include a shop task for manufacturing the component in a shop and materials needed to fabricate the component. Shop tasks can be routed to a task router 220 at stage 219, and material procurement orders can be routed to requisitions 216 at stage 221. The requisitions 216 can indicate which location to deliver the materials to and during which work phase based on information in the moab assemblies 208. When requisitioned materials are ready, they can await a call for delivery 224 at their corresponding locations. When a call for delivery 224 is made at stage 215, the corresponding components can be delivered to the site for receiving 226.

The task router 220 can assign tasks to work cells 222 at stage 223 based on information in the moab assemblies 208. For example, the moab assemblies 208 can indicate which shops, and which work cells 222 within each shop, have the appropriate machinery for performing shop tasks. A work cell 222 can refer to a division of a shop that performs a designated function. Using the moab assembly 100 as an example, a first work cell in a shop can be responsible for mixing cake batter 116, a second work cell can be responsible for baking the cake batter 116 into cake bread 120, a third work cell can be responsible for mixing the icing 132, and a fourth work cell can be responsible for applying the icing 132 to the cake bread 120.

After a component is fabricated by a work cell 222, it can wait for a call for delivery 224 at stage 225. After receiving the call for delivery 224, at stage 227 the component can be delivered to receiving 226 at the location indicated by the moab assembly 208.

FIG. 4 is a sequence diagram of an example method for generating project tasks based on a moab assembly. At stage 402, a user can create a model of a build project in a modeling application. The modeling application can be a CAD or BIM application like REVIT, SKETCHUP, and ARCHICAD. The model can include location and work phase information. For example, a build project can be multiple locations and multiple work phases per location. In the modeling application the user can assign a location and work phase for each component. For example, the user can assign components for an electrical system to one work phase of the project and components for plumbing to another work phase. The location and work phase information can alternatively be provided at a different stage. For example, a user can provide location and work phase information into the takeoff after stage 404 below or into a GUI of the application service after stage 406 below.

At stage 404, content from the model can be sent to a takeoff. The takeoff can be an application or interface compiles an account of all the components needed for a build project based on a model. The takeoff can quantify the amount of each material needed to complete the build project. The model application can send the model content as one or more data files, such as DWG, DXF, IFC, or RVT files. The model application can send the model content using any available communication protocol, such as an Application Programming Interface ("API") call.

At stage 406, the application service can access the takeoff data from the takeoff. For example, data from the takeoff can be stored in a location that the application service has access to, such as a database. Alternatively, the takeoff can send the data to the application service using a communication protocol, such as an API call.

At stage 408, the application service can identify components for the build project. For example, components in the takeoff data can include an identifier of the component. The application service can check the identifiers against a list of known components. Identifying components can include determining which components in the takeoff data have a corresponding maob assembly. For example, prior to creating the model for the build project, moab assemblies can be created for components in the modeling application. The moab assemblies can mapped to their corresponding component in the model application. The mappings can be universal or specific to particular modeling application. For example, some components may have a universal industry identifier that can be used for the mapping. Where model applications use their own identifiers, the user can map a moab assembly to the component in one or more model applications using their respective identifiers. The mappings can be stored in any format, such as a data table.

At stage 410, the application service can retrieve moab assemblies for components of the project. For example, the application service can check each component identifier against the mapping data table. For each matching identifier, the application service can retrieve the corresponding moab assembly file from a database. For example, the application service can make a database query or API call to the database.

At stage 412, the application service can break down materials and processes by location and work phase. For example, each moab assembly can identify processes or tasks for manufacturing and implementing the component, materials needed to fabricate the component, and information for procuring the materials. As an example, the moab assembly 100 from FIG. 1 includes procurement tasks, shop tasks, and field tasks. Moab assemblies can include other and elements tasks as well. For example, some components can be fabricated using different processes, and moab assembly for such components can include a decision task for prompting a user to choose which process to use. After the decision task, the moab assembly can separate into different branches, and the application service can follow the tasks designated in the chosen branch. This can help alleviate bottleneck issues in work cells. For example, if one work cell is overloaded, a user can select a fabrication method that uses an alternate work cell with a lower load. The moab assemblies can also distinguish between tasks that can be automated and tasks that require human action. For example, 3D printing a component can be an automated task, whereas fabricating a duct fitting may require that a person place a metal sheet into a cutting machine. Another example of an element that can be included in a moab assembly is a digital production state. Digital production states can be similar to production states, but digital production states refer to non-physical state of data, such as a file or a pointer to an API with parameters. Digital production states can represent a preparation process required to produce a physical part.

Tasks in a moab assembly can be mapped to locations and work phases. For example, shop tasks can be mapped to work cells, procurement tasks can be mapped to work cells based on their corresponding shop task, and field tasks can be mapped to a work phase. The mappings can be added by a user when creating the moab assembly or at any time thereafter. Using the moab assembly 100 as an example, the mixing shop task 114 can be mapped to a work cell with a mixer for mixing cake batter, the mixing shop task 130 can be mapped to a work cell with a mixer for mixing icing, the bake shop task 118 can be mapped to a work cell with an oven, and the apply icing shop task 134 can be mapped to a work cell with a machine for applying icing to a cake. The procurement tasks 102, 104, and 106 for flour 108, eggs 110, and baking powder 112 can be mapped to the same work cell as the mixing shop task 114 where they will be mixed. Likewise, the procurement tasks 122 and 124 for sugar 126 and butter 128 can be mapped to the same work cell as the mixing shop task 130 where they will be mixed. The field tasks for cutting 138 and eating 140 can be mapped to a work phase for when those tasks will take place, and the work phase will indicate the location. As a result, the application service will know, for each location and work phase, the tasks that will be performed and the materials that will be needed.

At stage 414, the application service can create work requests. The work requests can be based on tasks identified in the moab assemblies. For example, the application service can create work requests for procuring materials, fabricating components, and installing the components in the build project. At stage 416, the application service can send the work requests to an admin device, which can be any user device of an admin user. The admin can review the work requests for approval in a GUI. The GUI can allow the admin user to view the work requests in various formats, including by location and work phase.

At stage 418, an admin can approve the work requests, and the admin device can notify the application service of the approval at stage 420.

At stage 422, the admin can create procurement orders for materials needed for the build project. The admin can create procurement orders using the GUI of the application service or a GUI for another application, such as an application for placing work orders. In one example, the application service can auto populate procurement orders where a vendor is already specified in the moab assembly. The admin can review the order information and either place the order as is or make any necessary changes, such as changing the vendor or delivery location.

At stage 424, the application service can send work orders to the task router. Work orders can correspond to shop tasks for fabricating components. The task router can read the work orders and, at stage 426, assign the tasks to the correct work cell. When a task is completed, the next task in the next work cell can begin. After a component has been fabricated, the component can be delivered to the job site for implementation, such as installing the component.

FIG. 5 is an illustration of an example GUI 500 for generating a moab assembly. The GUI 500 includes a moab assembly that corresponds to the moab assembly 100 of FIG. 100 for baking a cake. Even numbered elements in FIG. 5 can correspond to elements in FIG. 1 with matching second and third digits. For example, element 502 corresponds to element 102, element 504 corresponds to element 104, and so on.

The GUI 500 visually illustrates to a user the processes and materials required to fabricate a component and how to install the component in the field. The GUI 500 includes nodes (illustrated by the even numbered elements) that correspond to procurement tasks, procured materials, shop tasks, field tasks, production states, assembly products, and final products. Each node is labeled with its corresponding node type. For example, nodes 502, 504, 506, 522, and 524 are labeled as procurement tasks; nodes 508, 510, 512, 526, and 528 are labeled as materials to be procured by their corresponding procurement tasks; nodes 514, 518, 530, and 534, are labeled as shop tasks; nodes 520 and 532 are labeled as assembly tasks; node 516 is labeled as a production state; node 536 is labeled as a final product; and nodes 538 and 540 are labeled as field tasks.

A user can filter the nodes displayed using the task tabs 501, 503, 505, and 507. The all tasks tab 501 displays all the nodes in the moab assembly. The user can select the procurement tasks tab 503 to display only procurement tasks, the field tasks tab 505 to display only field tasks, and the shop tasks tab 507 to display only shop tasks.

FIG. 6A is another illustration of the GUI 500 that includes a task window 610. The task window 610 can allow a user to create tasks and add them to a moab assembly. The user can choose which type of task to create by selecting one of procurement tasks tab 612, field tasks tab 614, and shop tasks tab 616. Each of the tabs 612, 614, and 616 can include an add tasks button 618 that, when selected, opens a window where the user can input information for a new task type, such as the name, description, and an image. The add tasks button 618 can be any kind of GUI selection mechanism, such as a toggle button or drop-down menu.

Created tasks can be displayed under the task tab corresponding to the task type. The user can add tasks listed under a task tab to add it to the moab assembly. For example, the user can select a task or use a drag-and-drop function. The task window 610 displays field tasks that have been created for the moab assembly 100. Two of those field tasks, the cut field task 620 and eat field task 630 have been added to the moab assembly 100. The cut task 620 corresponds to the cut field task 538, and the eat field task 630 corresponds to the eat field task 540.

The GUI 500 can allow a user to link tasks. For example, the GUI 500 can allow a user to draw an arrow from one node to another, indicating a relationship between them. As an example, a user can draw a first arrow from the cake bread assembly product 520 to the apply icing shop task 534 and a second arrow from the icing assembly product 532 to the apply icing shop task 534. The two arrows can indicate that the cake bread assembly product 520 and icing assembly product 532 are both used in the apply icing shop task 534. When a user links two nodes, a backend service can create a link for the two nodes.

In an example, links for nodes can be created using one or more data tables, such as relational data tables. For example, each node in a moab assembly can have an entry in a data table, and each entry can include multiple fields. For example, a node entry can include a field for the associated task's name, the task's type, a unique identifier ("ID"), required components, fabrication site, work phase, and so on. The entry for each node can also include one or more fields identifying other connected nodes. For example, data table entries for procurement nodes can include a linking field that links to a material node that it connects to. Linking can include any method that connects two nodes. As an example, each node in a moab assembly can be assigned a unique ID, and the unique ID of connected nodes can be inserted into the linking fields. The linking fields can create the moab assembly hierarchy by indicating the direction of the link. Using the moab assembly 100 as an example, the shop task 534 can include an incoming link field that includes the unique IDs of the cake bread assembly product 520 and icing assembly product 532. Likewise, the cake bread assembly product 520 and the icing assembly product 532 can include an outgoing linking field that includes the value of the unique ID of the apply icing shop task 534. The apply icing shop task 534 can also include an outgoing linking field with the unique ID of the vanilla cake final product 536. In one example, one data table can store entries for the nodes in a moab assembly, and a separate data table can store the linking information.

The GUI 500 can allow a user to assign portions of a moab assembly to a work phase for a project. As an example, a user can select the cut field task 538 and eat field task 540, such as using a drag select or individually selecting the tasks 538,540. The GUI 500 can give the user the option to assign the selected tasks 538, 540 to a work phase, such as electrical, mechanical, plumbing, etc. Work phase assignments can be used when generating project tasks based on the moab assembly 100.

FIG. 6B is an illustration of an example component addition window 650 in the GUI 500. The component addition window 650 can allow a user to add components to a task type. A user can access the component addition window 650 by selecting the add tasks button 618 or another selection mechanism in the GUI 500, for example, Components can include any known component required for the task. This can include materials, pre-assembled components, and so on. In an example, the GUI 500 can have access to a catalog of known components. A user can search through the catalog and add components to a task type using the component addition window 650. For example, FIG. 6B shows a component addition window 650 for a shop task type 652. The component addition window 650 can be displayed when the user creates a new task type, or, alternatively, the user can select an existing task or task type for adding components. In an example, components can be organized into separate catalogs according to the type of work they relate to. For example, there can be one catalog for electrical components, one for HVAC components, one for plumbing components, and so on. The component addition window 650 includes a catalog drop-down menu 654 that allows the user to select which catalog to display. For example, as shown in FIG. 6B, the user has selected an electrical catalog. The component addition window 650 can include a search tool 656 that allows a user to search for a specific component by name or other identifier. The component addition window 650 can also allow the user to filter components in a catalog by category. As an example, the component addition window 650 shows catalog categories 658 for the selected catalog. When a user selects a catalog category 658, the component addition window 650 can display subcategories for the selected catalog category 658. The user can continue to select subcategories until no lower-level subcategories remain, and the component addition window 650 can then display components for the selected subcategory that can be added to the task. The user can select a component and a quantity needed for the corresponding task type. The GUI 500 can allow a user to add multiple components to a task type.

Components added to a task type can be used when generating task projects for the moab assembly 100. For example, the components can be added to the BOM and/or a corresponding work phase. In some examples, the components can include ordering information, and such components can be automatically ordered and sent to the proper location when a task project is generated.

When a user adds a task to a moab assembly, some properties of the task can be prepopulated, such as the task type and a unique ID generated for the task. Properties previously provided by a user for the selected task type can also be prepopulated, such as a task name, components required for the task, a vendor for each required component, pricing information for each component, a fabrication site or work site where the component can be fabricated, and so on. A user can provide any missing or additional property information. In one example, some task types can have fields that require user input. The GUI 500 can prompt the user to provide property information for such fields. In one example, the GUI 500 can display a window for providing such property information when the user adds the task to the moab assembly. Alternatively, the GUI 500 can require that the user to complete required fields before saving the moab assembly.

FIG. 7 is an illustration of an example system for generating project tasks based on a moab assembly. An application server 720 can include a takeoff 722 and an application service 724. The application server 720 can be a single server or a group of servers, including multiple servers implemented virtually across multiple computing platforms. The takeoff 722 can be any software application for compiling an account of all the components needed for a build project. The takeoff 722 can receive data for a build project from a modeling application, such as the modeling application 712 on the user device 710.

The user device 710 can be one or more processor-based devices, such as a personal computer, tablet, or cell phone. The modeling application 712 can be any modeling software application for modeling build projects. For example, the modeling application 712 can be a CAD or BIM application like REVIT, SKETCHUP, and ARCHICAD. Although the modeling application 712 is illustrated as being part of the user device 710, the modeling application can include multiple components on multiple devices. For example, the modeling application 712 can include a front-end interface at the user device 710 and a back-end system on a separate server. In such an example, the takeoff 722 can receive build project data from the back-end system. The user device 710, or the modeling application server, can send the build project data to the application server 720 as one or more data files, such as DWG, DXF, IFC, or RVT files. The build project data can be sent using any communication protocol, such as Hypertext Transfer Protocol Secure ("HTTPS") or an Application Programming Interface ("API") call.

The application service 724 can be a backend service that provides a moab assembly GUI 714. As explained previously herein, a moab assembly can be one or more data files that logically links materials and tasks for a component of a build project. The moab assembly GUI 714 can be a front-end interface that allows a user to create and manage moab assemblies 732, such as the GUI 500 from FIGS. 5 and 6. When a user creates a moab assembly 732, the application service 724 can store the moab assembly 732 in a database 732 where it can be accessed for future use. For example, when a user creates a model of a built project using the modeling application 712, the application service 724 can retrieve moab assemblies 732 corresponding to components in the build project data. The application service 724 can process the build project data with the moab assemblies 732 so that users can view materials and tasks for each work phase in the build project.

The application service 724 can automate some tasks for build projects. For example, the application service 724 can communicate with a task router 740 that manages shop tasks for an organization. Some tasks can be mapped to work cells 750 of an organization. A work cell can be any machine or group of machines that perform a specified task. For such tasks, the task router 740 can automatically assign the tasks to their corresponding work cells 750.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A computer-implemented method for generating tasks for a build project, comprising:

retrieving, by a processor, a moab assembly corresponding to a component of the build project, the moab assembly comprising:
- a set of procurement tasks, each procurement task identifying a material to be sourced from a designated vendor;
- a set of shop tasks, each shop task identifying a fabrication process to be performed at an identified work cell using one or more of the materials;
- a set of field tasks, each field task identifying installation of the component into the build project; and
- a materials hierarchy that identifies, for at least one of the shop tasks, an intermediate output produced by the shop task in a production state and links the intermediate output as an input to a subsequent shop task or field task;

integrating the moab assembly with build project data derived from a computer-aided design ("CAD") application or building information model ("BIM") application by mapping the component in the build project data to the moab assembly and, based on the materials hierarchy, determining work phases of the build project and sequencing of the procurement, shop, and field tasks;

displaying, in a graphical user interface ("GUI"), the procurement tasks, shop tasks, and field tasks by work phase together with corresponding materials and production states;

automatically initiating actions without manual intervention, including:

automatically transmitting a purchase order to a vendor identified in a procurement task; and automatically generating a fabrication job to be executed at a work cell identified in a shop task, wherein generating the fabrication job comprises, by a task router, assigning the shop task to the identified work cell based on mapping data identifying machinery at the identified work cell configured to perform the fabrication process, and causing the identified work cell to execute the fabrication process; and in response to receiving an update indicating a production state change associated with a task, dynamically updating the GUI to show the initiated actions and a predicted effect of the production state change on subsequent tasks of the build project based on the materials hierarchy.

2. The method of claim 1, wherein the moab assembly is stored as one or more data tables comprising:

a node entry for each of the procurement tasks, shop tasks, field tasks and production state; and an edge entry linking the node entries by incoming and outgoing linking fields.

3. The method of claim 1, wherein the identified work cell is selected from a plurality of work cells based on availability of machinery at each work cell and proximity to a location of the build project.

4. The method of claim 1, wherein the moab assembly identifies a delay tolerance for at least one task, and the graphical user interface displays a predicted impact of a detected delay on downstream tasks of the build project.

5. The method of claim 1, wherein the procurement tasks specify vendor selection criteria including at least one of: vendor identity, delivery timeframe, or material cost threshold, and wherein automatically initiating comprises selecting a vendor based on the criteria.

6. The method of claim 1, wherein the graphical user interface provides a drag-and-drop interface for linking a shop task output to a subsequent field task input.

7. The method of claim 1, wherein integrating the moab assembly with build project data comprises mapping tasks to defined work phases in a BIM model such that installation tasks are scheduled only after prerequisite shop tasks are completed.

8. The method of claim 1, wherein automatically initiating a procurement order comprises generating an electronic data interchange (EDI) message or application programming interface (API) call to an external vendor system.

9. The method of claim 1, wherein the GUI further displays a critical path view, wherein the critical path view highlights the sequence of procurement, shop, and field tasks that determine a minimum completion time for the build project.

10. A non-transitory computer-readable medium including instructions for generating tasks for a build project, the instructions causing a processor to perform stages, the stages comprising:

retrieving a moab assembly corresponding to a component of the build project, the moab assembly comprising:

a set of procurement tasks, each identifying a material to be sourced from a designated vendor;

a set of shop tasks, each identifying a fabrication process to be performed at an identified work cell using one or more of the procured materials;

a set of field tasks, each identifying installation of the component into the build project; and a materials hierarchy that identifies, for at least one of the shop tasks, an intermediate output produced by the shop task in a production state and linked as an input to a subsequent shop task or field task;

integrating the moab assembly with build project data derived from a computer-aided design ("CAD") application or building information model ("BIM") application by mapping the component in the build project data to the moab assembly and, based on the materials hierarchy, determining work phases of the build project and sequencing of the procurement, shop, and field tasks;

displaying, in a graphical user interface ("GUI"), the procurement tasks, shop tasks, and field tasks by work phase together with corresponding materials and production states;

automatically initiating actions without manual intervention, including:

automatically transmitting a purchase order to a vendor identified in a procurement task; and automatically generating a fabrication job to be executed at a work cell identified in a shop task, wherein generating the fabrication job comprises, by a task router, assigning the shop task to the identified work cell based on mapping data identifying machinery at the identified work cell configured to perform the fabrication process, and causing the identified work cell to execute the fabrication process; and in response to receiving an update indicating a production state change associated with a task, dynamically updating the GUI to show the initiated actions and a predicted effect of the production state change on subsequent tasks of the build project based on the materials hierarchy.

11. The non-transitory computer-readable medium of claim 10, wherein the moab assembly is stored as one or more data tables comprising:

a node entry for each of the procurement tasks, shop tasks, field tasks and production state; and an edge entry linking the node entries by incoming and outgoing linking fields.

12. The non-transitory computer-readable medium of claim 10, wherein the identified work cell is selected from a plurality of work cells based on availability of machinery at each work cell and proximity to a location of the build project.

13. The non-transitory computer-readable medium of claim 10, wherein integrating the moab assembly with build project data comprises mapping tasks to defined work phases in a BIM model such that installation tasks are scheduled only after prerequisite shop tasks are completed.

14. The non-transitory computer-readable medium of claim 10, wherein the GUI further displays a critical path view, wherein the critical path view highlights the sequence of procurement, shop, and field tasks that determine a minimum completion time for the build project.

15. The non-transitory computer-readable medium of claim 10, wherein the procurement tasks specify vendor selection criteria including at least one of: vendor identity, delivery timeframe, or material cost threshold, and wherein automatically initiating comprises selecting a vendor based on the criteria.

16. A system for generating tasks for a build project, comprising:

a memory storage including a non-transitory, computer-readable medium comprising instructions; and a hardware-based processor that executes the instructions to carry out stages comprising:

retrieving a moab assembly corresponding to a component of the build project, the moab assembly comprising:

a set of procurement tasks, each identifying a material to be sourced from a designated vendor;

a set of shop tasks, each identifying a fabrication process to be performed at an identified work cell using one or more of the procured materials;

a set of field tasks, each identifying installation of the component into the build project; and a materials hierarchy that identifies, for at least one of the shop tasks, an intermediate output produced by the shop task in a production state and linked as an input to a subsequent shop task or field task;

integrating the moab assembly with build project data derived from a computer-aided design ("CAD") application or building information model ("BIM") application by mapping the component in the build project data to the moab assembly and, based on the materials hierarchy, determining work phases of the build project and sequencing of the procurement, shop, and field tasks;

displaying, in a graphical user interface ("GUI"), the procurement tasks, shop tasks, and field tasks by work phase together with corresponding materials and production states;

automatically initiating actions without manual intervention, including:

automatically transmitting a purchase order to a vendor identified in a procurement task; and automatically generating a fabrication job to be executed at a work cell identified in a shop task, wherein generating the fabrication job comprises, by a task router, assigning the shop task to the identified work cell based on mapping data identifying machinery at the identified work cell configured to perform the fabrication process, and causing the identified work cell to execute the fabrication process; and in response to receiving an update indicating a production state change associated with a task, dynamically updating the GUI to show the initiated actions and a predicted effect of the production state change on subsequent tasks of the build project based on the materials hierarchy.

17. The system of claim 16, wherein the moab assembly is stored as one or more data tables comprising:

a node entry for each of the procurement tasks, shop tasks, field tasks and production state; and an edge entry linking the node entries by incoming and outgoing linking fields.

18. The system of claim 16, wherein the identified work cell is selected from a plurality of work cells based on availability of machinery at each work cell and proximity to a location of the build project.

19. The system of claim 16, wherein integrating the moab assembly with build project data comprises mapping tasks to defined work phases in a BIM model such that installation tasks are scheduled only after prerequisite shop tasks are completed.

20. The system of claim 16, wherein the GUI further displays a critical path view, wherein the critical path view highlights the sequence of procurement, shop, and field tasks that determine a minimum completion time for the build project.

* * * * *